US011905733B2

(12) United States Patent
Baker et al.

(10) Patent No.: US 11,905,733 B2
(45) Date of Patent: Feb. 20, 2024

(54) DAMPENER FOR AN EXIT DEVICE

(71) Applicant: ASSA ABLOY Accessories and Door Controls Group, Inc., New Haven, CT (US)

(72) Inventors: Vincent Baker, Rockwood, PA (US); Michael Connell, Connellsville, PA (US); Michael Swearman, Davidsville, PA (US); Douglas Thompson, Somerset, PA (US)

(73) Assignee: ASSA ABLOY Accessories and Door Controls Group, Inc., New Haven, CT (US)

( * ) Notice: Subject to any disclaimer, the term of this patent is extended or adjusted under 35 U.S.C. 154(b) by 652 days.

(21) Appl. No.: 16/879,937

(22) Filed: May 21, 2020

(65) Prior Publication Data

US 2020/0370332 A1    Nov. 26, 2020

Related U.S. Application Data

(60) Provisional application No. 62/852,339, filed on May 24, 2019.

(51) Int. Cl.
| | |
|---|---|
| *E05B 17/00* | (2006.01) |
| *F16F 3/093* | (2006.01) |
| *E05B 15/16* | (2006.01) |
| *F16F 15/08* | (2006.01) |
| *E05B 65/10* | (2006.01) |
| *E05B 65/00* | (2006.01) |

(52) U.S. Cl.
CPC ...... *E05B 17/0041* (2013.01); *E05B 15/1635* (2013.01); *F16F 3/093* (2013.01); *F16F 15/08* (2013.01); *E05B 65/0025* (2013.01); *E05B 65/1006* (2013.01); *E05B 65/1073* (2013.01); *E05Y 2900/132* (2013.01); *F16F 2224/02* (2013.01); *F16F 2226/00* (2013.01); *F16F 2226/04* (2013.01); *F16F 2228/066* (2013.01); *F16F 2236/04* (2013.01)

(58) Field of Classification Search
CPC ............ E05B 17/0041; E05B 15/1635; E05B 65/0025; E05B 65/1073; E05Y 2900/132; F16F 3/093; F16F 15/08; F16F 2224/02; F16F 2226/00; F16F 2226/04; F16F 2228/066; F16F 2236/04
See application file for complete search history.

(56) References Cited

U.S. PATENT DOCUMENTS

| | | | | |
|---|---|---|---|---|
| 1,386,551 | A | * | 8/1921 | Bumbarger ............... E05C 3/14 |
| | | | | 292/195 |
| 2,351,725 | A | * | 6/1944 | Wack .................... F16F 1/3732 |
| | | | | 248/635 |

(Continued)

FOREIGN PATENT DOCUMENTS

CA        3131468 S    10/2020

*Primary Examiner* — Robert A. Siconolfi
*Assistant Examiner* — James K Hsiao
(74) *Attorney, Agent, or Firm* — Wolf, Greenfield & Sacks, P.C.

(57) ABSTRACT

A dampener for an exit device may be disposed between a portion of an exit device actuator and an exit device chassis so that the dampener dampens vibrations to reduce noise of the exit device and/or inhibit unintentional movement of the actuator to an actuated position. The dampener may be composed at least partially of a viscoelastic material.

19 Claims, 8 Drawing Sheets

(56) References Cited

U.S. PATENT DOCUMENTS

| | | | | |
|---|---|---|---|---|
| 2,848,272 | A * | 8/1958 | Storch | B62D 25/12 49/377 |
| 3,335,689 | A * | 8/1967 | Hein | E02B 3/26 293/120 |
| 4,382,620 | A * | 5/1983 | Horgan, Jr. | E05B 65/106 292/336.3 |
| 4,711,480 | A * | 12/1987 | Horgan, Jr. | E05C 19/166 49/141 |
| 5,403,047 | A * | 4/1995 | Walls | E05C 1/14 292/336.3 |
| 6,345,420 | B1 * | 2/2002 | Nabeshima | F16B 21/084 24/297 |
| 6,511,104 | B1 * | 1/2003 | Horgan, Jr. | E05B 3/00 292/336.3 |
| 7,309,087 | B2 * | 12/2007 | Lane | E05B 85/247 292/216 |
| 7,347,461 | B2 * | 3/2008 | Sprague | E05B 17/22 292/336.3 |
| 7,841,632 | B2 * | 11/2010 | Tracy | F16F 15/08 292/121 |
| 7,849,718 | B2 * | 12/2010 | Ambrass | E05B 65/0025 70/108 |
| 8,491,020 | B2 * | 7/2013 | Lopes | B60D 1/60 292/DIG. 56 |
| 8,807,607 | B2 * | 8/2014 | Glickman | E05B 15/0053 292/DIG. 7 |
| 9,447,840 | B2 * | 9/2016 | Morris | B60R 21/04 |
| 10,619,388 | B2 * | 4/2020 | Shah | E05C 1/14 |
| 10,907,377 | B2 * | 2/2021 | Shah | E05B 17/0045 |
| 11,124,996 | B2 * | 9/2021 | Yalamati | E05C 1/14 |
| 2002/0050029 | A1 * | 5/2002 | Nabeshima | F16B 19/1081 24/297 |
| 2003/0062725 | A1 * | 4/2003 | Horgan, Jr. | E05B 65/106 292/92 |
| 2004/0094986 | A1 * | 5/2004 | Landvik | B60J 3/0204 296/70 |
| 2005/0045086 | A1 * | 3/2005 | Stoll | B63B 21/56 114/219 |
| 2006/0148919 | A1 | 7/2006 | Maurer et al. | |
| 2015/0308538 | A1 * | 10/2015 | Morris | F16B 5/0657 267/141 |
| 2016/0130846 | A1 * | 5/2016 | Shah | E05C 1/14 292/138 |
| 2017/0016262 | A1 * | 1/2017 | Kwak | E05F 5/022 |
| 2018/0128015 | A1 | 5/2018 | Shah et al. | |
| 2019/0360547 | A1 * | 11/2019 | Ohji | F16F 3/093 |
| 2020/0016844 | A1 * | 1/2020 | Koshi | C08J 5/243 |
| 2020/0062925 | A1 * | 2/2020 | Tamai | C08L 77/06 |
| 2020/0063470 | A1 * | 2/2020 | Yalamati | E05C 1/004 |
| 2021/0215064 | A1 * | 7/2021 | Vinjanampati | B64D 29/06 |

* cited by examiner

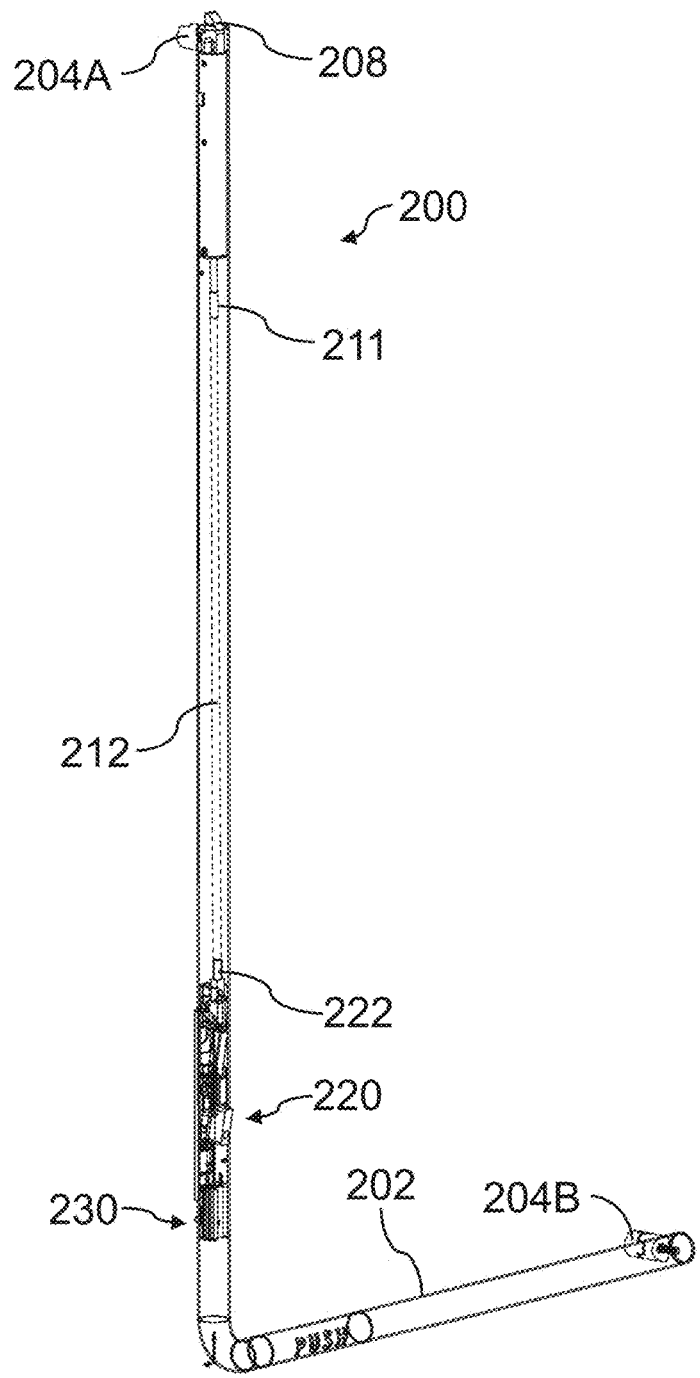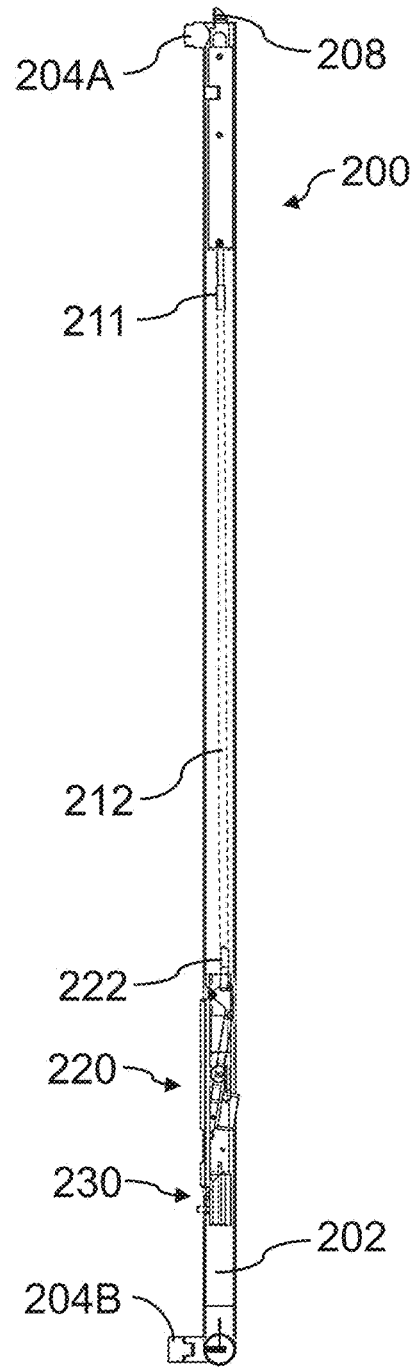
FIG. 3
FIG. 4

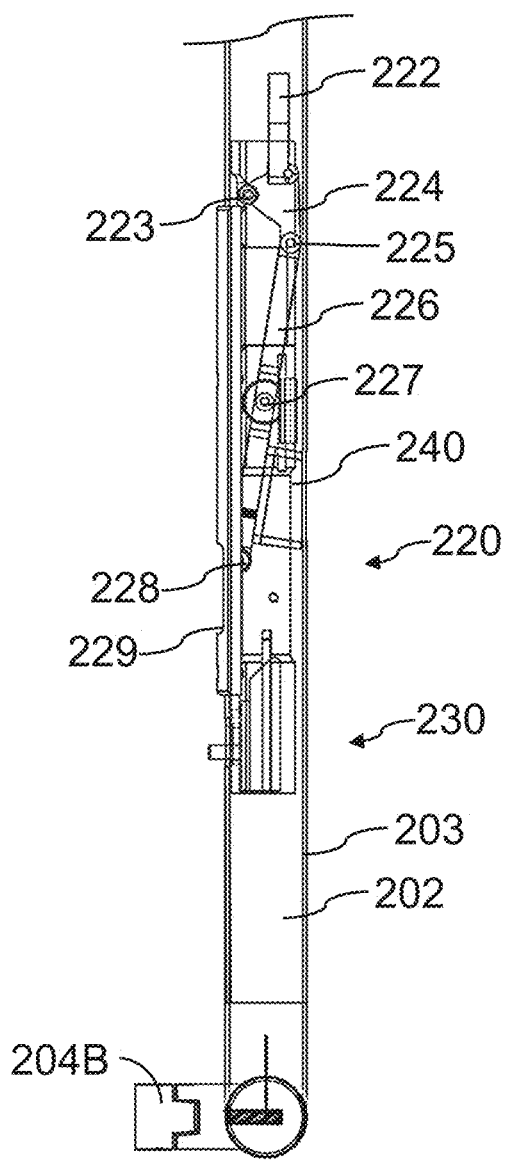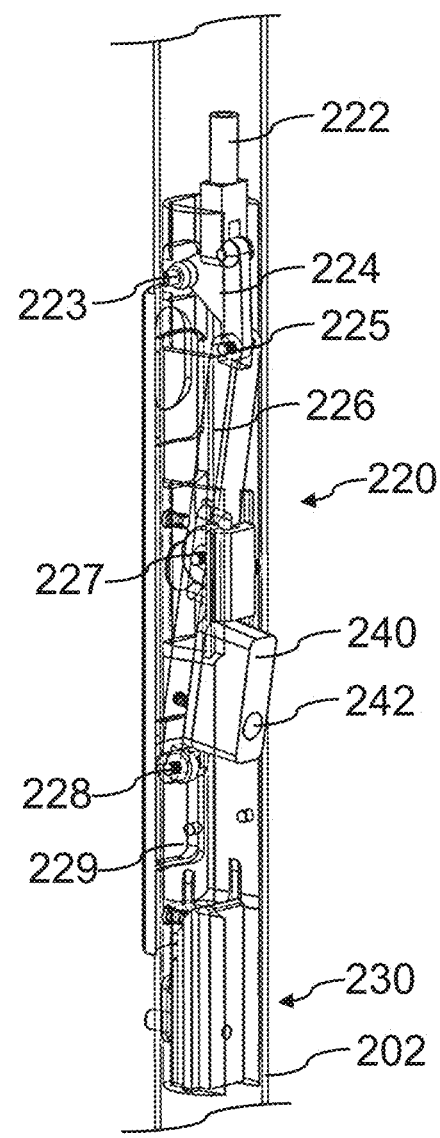

DAMPENER FOR AN EXIT DEVICE

RELATED APPLICATIONS

This application claims the benefit under 35 U.S.C. § 119(e) to U.S. Provisional Application Ser. No. 62/852,339, titled "Dampener for an Exit Device", filed on May 24, 2019, which is herein incorporated by reference in its entirety.

FIELD

Disclosed embodiments are related to exit devices and more particularly to dampeners for push bars associated with exit devices.

BACKGROUND

Exit devices are typically employed on glass doors in compact arrangements so as to limit the visual interference with the glass door. These conventional exit devices typically include a push bar to actuate one or more vertical rods to selectively latch or unlatch the glass door.

SUMMARY

In some embodiments, a dampener for an exit device includes a base formed of a first material, where the base is configured to be secured to a lever of the exit device, and a body formed of a second material coupled to and extending from the base. The body is configured to abut an inside surface of a chassis of the exit device. The first material is a thermoplastic and the second material is a viscoelastic material.

In some embodiments, an exit device includes a chassis, a lever disposed in the chassis configured to move between a first position and a second position, a latch configured to move between an engaged and a disengaged position, and a dampener disposed inside the chassis between the lever and an inside surface of the chassis and in contact with both the lever and the inside surface of the chassis. The latch is in the engaged position when the lever is in the first position and is in the disengaged position when the lever is in the second position. The dampener is configured to compress when the lever is moved to the second position.

In some embodiments, a method of installing a dampener into an exit device includes attaching a base of the dampener to a lever of the exit device and positioning the lever and attached dampener inside a chassis of the exit device, where the dampener contacts an inside surface of the chassis when the lever and attached dampener are positioned inside the chassis.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 3 is a perspective view of a first side of the exit device of FIG. 2;

FIG. 4 is a side view of the exit device of FIG. 3;

FIG. 5 is an enlarged side view of one embodiment of a actuator for an exit device having a dampener;

FIG. 6 is a perspective view of the actuator of FIG. 5;

DETAILED DESCRIPTION

Figure 1:
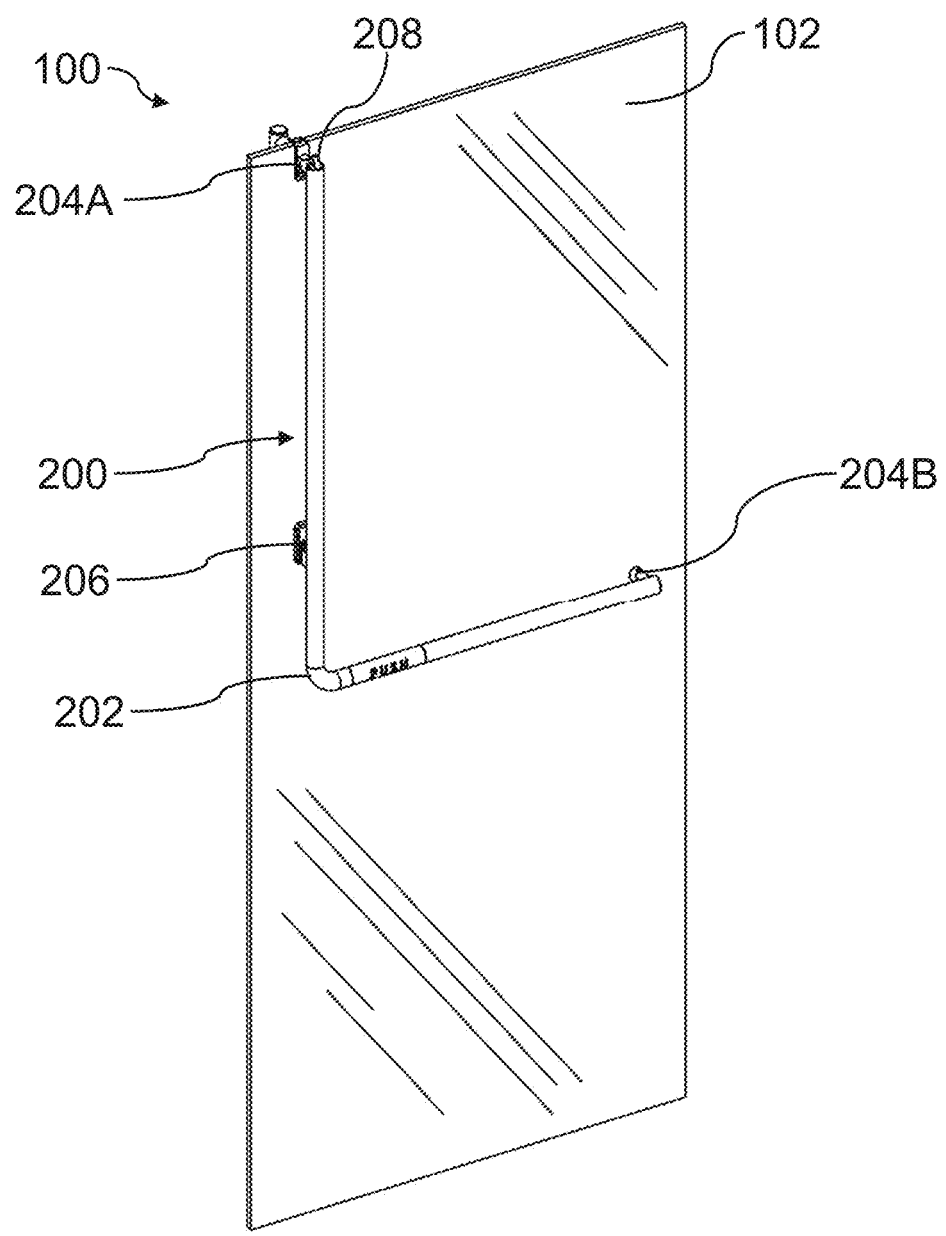
FIG. 1 is a perspective view of one embodiment of a glass door including an exit device.

Exit devices are typically employed on glass doors in compact packages to allow simple actuation of a door latch while minimizing the aesthetic impact to the glass door. For example, an exit device actuator may be housed in a cylindrical chassis which occupies a small portion of the overall door surface area. However, due to the limited space constraints for such exit devices, there may be metal-on-metal or other hard material contact during actuation which may induce vibrations which increase the noise of the exit device relative to traditional exit devices. Additionally, the mechanical arrangement of certain actuators in exit devices may leave the exit device actuator susceptible to travel as a result of actuator components vibrating or bouncing (i.e., rebounding off of a chassis wall or other exit device components) when a door is vibrated or shaken from an exterior (i.e., unsecured) side of the door.

In view of the above, the inventors have recognized the benefits of a dampener positioned between moving components of an exit device actuator and a chassis of the exit device. The dampener may inhibit metal-on-metal or other hard material contact between the actuator and the chassis to reduce noise generated by the exit device during operation. Additionally, the damper may effectively take up the space between the chassis and the actuator and bias the actuator to an unactuated position and may absorb any energy transmitted to the actuator through vibrations or bouncing which may otherwise cause the actuator to travel which could compromise the latch security of the door. Accordingly, the dampener of exemplary embodiments described herein may increase the security of an associated door secured by an exit device, and may reduce the operational noise generated by the exit device, making an exit device suitable for low-noise environments such as offices, hospitals, etc.

In some embodiments, a dampener includes a base and a body. The base may be formed of a first material, such as a cast or hardened polyurethane or other thermoplastic, and the body may be formed of a second material, such as a polyurethane foam or another viscoelastic material suitable for absorbing vibrations from an exit device actuator. The base and the body may be integrally molded. The dampener may include a through hole configured to receive a screw or bolt used to fasten the dampener to a moving component of the actuator. The dampener may be disposed between the actuator component and an inside surface of a chassis in which the actuator is disposed, thereby isolating the actuator component from contacting the inside surface. The dampener may span the full distance or otherwise take up the space between the actuator and the inside surface. Accordingly, the dampener may be compressed when the actuator is actuated to allow for normal operation of the exit device, and may also compress to absorb energy transmitted through the actuator from the latch (e.g., when an associated door is shaken or forced). The dampener may bias the actuator to an unactuated position, so that these external forces are not able to cause the actuator to vibrate or bounce to an extent which would cause travel to an actuated position, which would otherwise allow the door to be released. The dampener may also absorb vibrations which may otherwise generate audible noise, thereby quieting the exit device. The dampener may provide a non-linear reaction force as it is compressed, meaning the dampener provides more force urging the actuator to the unactuated position the more it is compressed. Such an arrangement may further improve the resiliency of the exit device to externally applied forces or vibrations, as the exponential force curve may allow a user to manually provide enough force to actuate the door while preventing shaking of the door or other externally applied forces from reaching a threshold force necessary to overcome the reaction force and actuate the actuator.

According to exemplary embodiments described herein, a dampener may be disposed on various elements of an exit device which control the movement of a latch between an engaged (i.e., extended) and a disengaged (i.e., retracted) position. For example, a dampener may be disposed between a lever and an inside surface (e.g., a wall) of an exit device chassis and may be compressed as the lever moves closer to the inside surface. As another example, a dampener may be disposed between linearly coupled elements, such as between a vertical rod and a latch, or between a door actuator mount and a door. Of course, the dampener may be disposed between any suitable elements of an exit device to reduce vibration and promote latch security of the exit device, as the present disclosure is not so limited.

In some embodiments, multiple dampeners may be disposed on various element of an exit device. For example, a first dampener may be disposed between a lever of an exit device actuator and a chassis of the exit device, and a second dampener may be disposed between a vertical rod and a latch. Such an arrangement may further promote resiliency to external force applied to an associated door, and may also further improve vibration absorption for noise reduction. Any suitable number of dampeners may be employed on any suitable components of an exit device, as the present disclosure is not so limited.

According to exemplary embodiments described herein, a dampener may apply a biasing force to an exit device actuator toward an unactuated position. This biasing force, or preload, may be a suitable amount to resist vibrations and motion associated with pulling or banging on an exterior side of the door. However, the biasing force applied to the actuator may also be less than that required by various past, current, or future building codes, including, but not limited to, NFPA 101, IBC, ANSI/BHMA A156.3, ULC-S132-07, California Building Code Sec. 11B-309.4, and UL 305. Thus, the biasing force or preload applied by the dampener may be selected to appropriately reduce vibrations or motion of an actuator in response to externally applied forces while allowing an operator to operate the exit device normally with a code-appropriate activation force.

It should be noted that while exemplary embodiments herein may be described with reference to glass doors and low profile exit devices, the dampeners described herein may be employed on any door or exit device. Doors which may employ an exit device include glass doors, metal doors, wooden doors, and composite doors. Exit devices which may include one or more dampeners include rim devices, surface vertical rod devices, concealed vertical rod devices, and others. In some cases, dampeners of exemplary embodiments described herein may be employed on door latching devices other than push activated devices, such as knob actuated devices, handle actuated devices, pull actuated devices, or any other suitable device having moving components where vibration reduction is desirable.

According to exemplary embodiments described herein, a dampener may be pre-installed on an exit device or may be retrofit to an exit device by an end user or a field service technician. That dampener may include a mounting system which is easy to use so that the dampener may be easily installed to reduce noise and/or improve latch security. In some embodiments, the dampener may include features which simplify installation for retrofit applications, such as lubricating or low-friction layers which simplify the correct positioning of the dampener inside of a narrow exit device chassis. That is, a lubricating layer may allow a dampener to easily slide when in contact with an inside surface of a chassis, making positioning the dampener much easier for an end user or field service technician.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a perspective view of one embodiment of a glass door 100 including an exit device 200. As shown in FIG. 1, the exit device is a low profile exit device which does not substantially obscure a glass panel 102 which forms the glass door. The exit device includes a first hinge 204A, a second hinge 204B and a door actuator 206 which function as the interface points between the exit device and the door, so that the majority of the glass panel remains uncovered. A chassis 202 is suspended from the first hinge and second hinge, and serves as a push bar to allow a user to operate the door. The exit device includes a latch 208 which projects from a top of the chassis and secures the door in an associated door frame transom when the latch is in the engaged (i.e., extended) position. According to the embodiment of FIG. 1 and as will be discussed further below, when the push bar is pushed toward the glass panel, the door actuator engages an actuator disposed in the chassis to move the latch to the disengaged (i.e., retracted) position to release the door. As the chassis is pushed by the user, the push bar rotates about the first hinge 204A and the second hinge 204B to bring a portion of the push bar nearer the door actuator closer to the glass panel. Though the exit device 200 is shown and described as being installed on a glass pane door, the present disclosure is not limited in this respect, as the exit device may be installed on a door formed of any material or combination of materials, such as wood, metal, plastic, fiberglass and/or glass.

Figure 2:
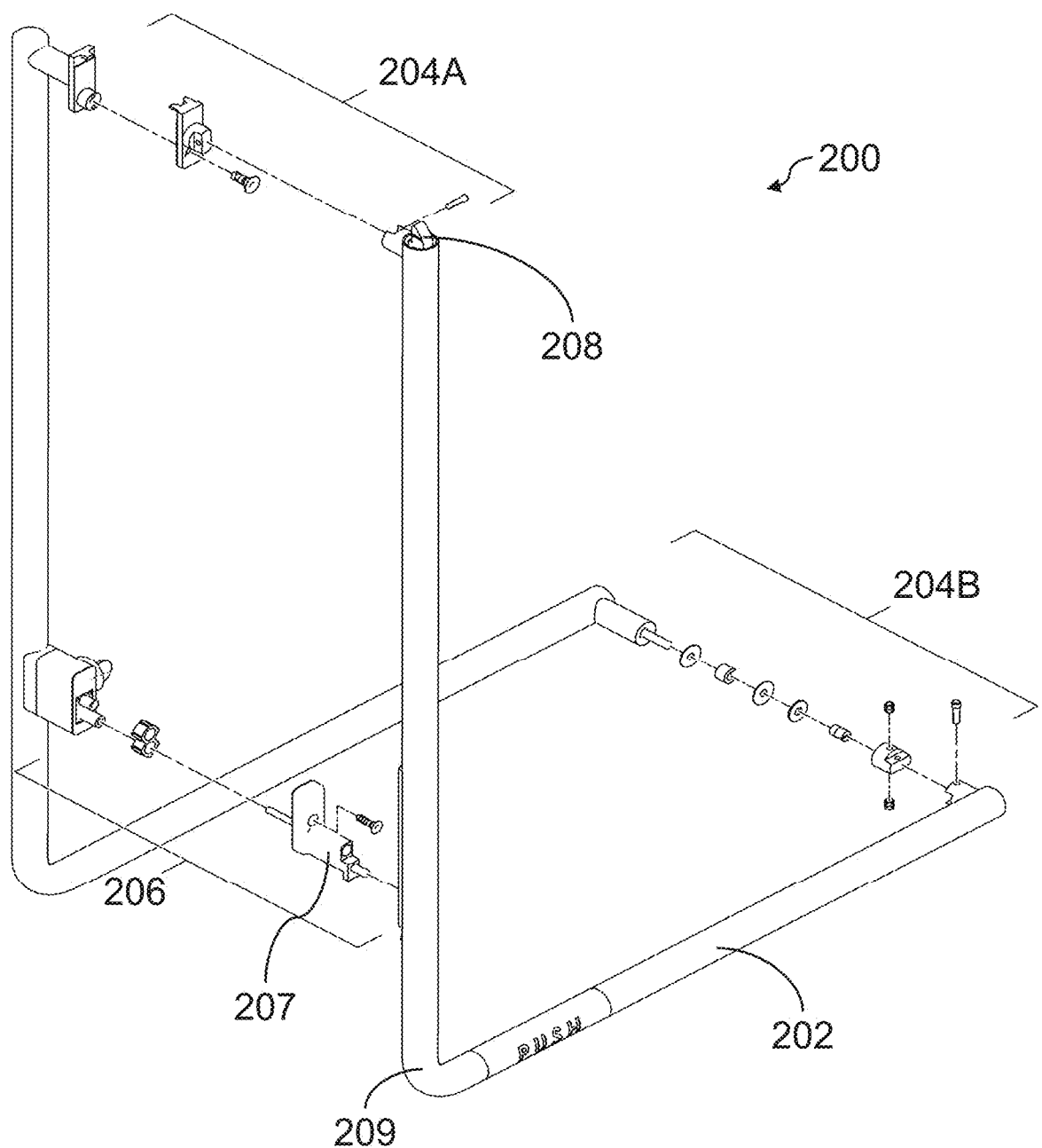
FIG. 2 is an exploded view of the exit device of FIG. 1.

FIG. 2 is an exploded view of one embodiment of the exit device 200 of FIG. 1 showing the door interface points and chassis in detail. The exit device includes an interior side and an exterior side. The exterior side (not shown in full detail in FIG. 1 but shown in FIG. 2) acts as a door pull to aid in opening the door from the exterior side of the door. As noted previously, the first hinge 204A, second hinge 204B, and door actuator 206 serve as the interface points between a glass door panel and the exit device. The first hinge 204A is coupled through the glass panel to a corresponding mount on an opposing side of the door. That is, the first hinge is coupled through and supported by a bolt passing through a hole formed the glass pane. The first hinge allows rotation of the chassis 202 about a horizontal axis relative to the installed door orientation. The second hinge 204B is also coupled through the glass panel to a corresponding mount on an opposing side of the panel with a second bolt, and allows rotation of the chassis 202 about a vertical axis relative to the installed door orientation. Accordingly, the first and second hinges enable rotation about orthogonal axes to that a portion of the chassis near the door actuator 206 may move towards or away the glass panel. In particular, the corner 209 moves in an arc about the two hinges closer to the glass panel when pushed. Such movement allows a door actuator projection 207 to extend further into the chassis to manipulate an actuator of the exit device, as will be discussed further with reference to FIGS. 3-6.

FIGS. 3-4 are a perspective view and side view, respectively, of the interior portion of the exit device 200 of FIG. 2 with the chassis 202 shown transparently to reveal the internal components of the exit device. As noted previously, the exit device chassis is suspended from a glass panel from the first hinge 204A and the second hinge 204B to a portion of the exit device near the door actuator to move closer to or further from the door. As shown in FIGS. 3-4, the exit device includes an actuator 220 which is aligned with the door actuator shown in FIGS. 1-2. The actuator 220 is configured to transmit the substantially linear relative motion between the chassis and the door actuator into motion of the latch 208. In particular, the actuator is configured to convert the motion of the chassis toward the glass panel and door actuator into movement of the latch 208 from an engaged position to a disengaged position. The actuator includes a transmission formed of levers which converts this push motion of the chassis into vertical motion of a vertical rod 212 shown in dashed lines. The vertical rod is coupled to the actuator on a first end by an actuator coupling 222 and is coupled to the latch 208 on a second end by a latch coupling 211. Accordingly, linear motion generated by the actuator as a result of the movement of the chassis may be transmitted to the latch. In the embodiment shown in FIGS. 3-4, the latch 208 may be biased to an engaged position with a compression spring (not shown in the figure), and the vertical rod 212 may move towards the actuator 220 against the biasing force to disengage (i.e., retract) the latch when the chassis is pushed by a user. Of course, while a vertical rod is shown in FIGS. 3-4, any suitable linkage may be employed, such as cables and tethers, as the present disclosure is not so limited. According to the embodiment shown in FIGS. 3-4, the exit device also includes a dogging switch 230 which may be used to retain the chassis in the depressed position, thereby maintaining the latch in a disengaged position.

FIGS. 5-6 are an enlarged side view and a perspective view, respectively, of one embodiment of an actuator 220 for an exit device having a dampener 240. As shown in FIGS. 5-6, a chassis 202 which houses the actuator is shown transparently for clarity. According to the embodiment of FIGS. 5-6, the actuator is configured to convert transverse motion of the chassis 202 (i.e., towards or away from an associated glass panel) into vertical motion of the actuator coupling 222 which may be coupled to a vertical rod or tether. That is, the actuator effectively transfers linear motion approximately 90 degrees so a latch may be retracted when the chassis is pushed by a user. As shown in FIGS. 5-6, the actuator includes a rotary linkage 224 and a lever 226. The rotary linkage is configured to rotate about rotary linkage pin 223 and is coupled to the lever 226 via a joining pin 225 which allows relative rotation of the rotary linkage and the lever. The lever is configured to rotate about a lever pin 227 which is disposed between the joining pin and a door actuator engagement portion 228. The door actuator engagement portion 228 is positioned adjacent a window 229 so that a door actuator attached to an associated door may engage the door actuator engagement portion. As will be discussed further with reference to FIGS. 10-13, when the chassis is pushed towards an associated door, the door actuator engagement portion is pushed to rotate the lever counterclockwise relative to the page. The joining pin 225 in turn is moved to rotate the rotary linkage 224 in a clockwise direction relative to the page which moves the actuator coupling down relative to the page to retract an associated latch.

As shown in FIGS. 5-6, the actuator for the exit device includes a dampener disposed between the lever 226 and the chassis 202. In particular, the dampener is attached to the lever between the door actuator engagement portion 228 and the lever pin 227, and is in contact an inside surface 203 of the chassis opposite the lever in that location. In particular, as shown in FIG. 6, the dampener is attached to the lever with a fastener disposed in through hole 242 formed in the dampener. Accordingly, when the lever is rotated in a counter clockwise direction to retract an associated latch, the damper is compressed between the lever and the chassis. As will be discussed further below, the damper may include a viscoelastic material to absorb vibrations in the lever and bias the lever toward a position where the actuator is unactuated and an associated latch remains engaged.

Figure 7:
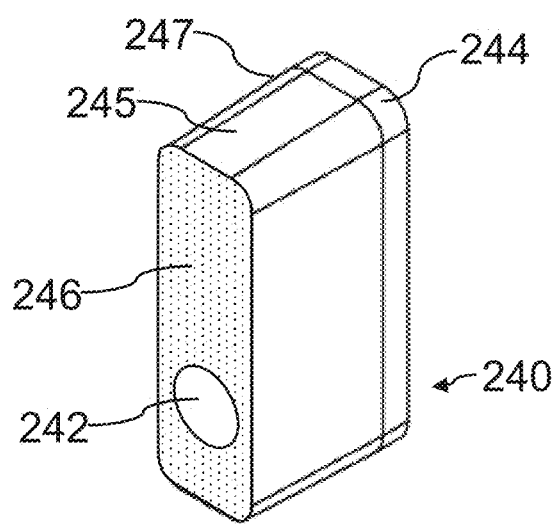
FIG. 7 is perspective view of one embodiment of a dampener.
Figure 8:
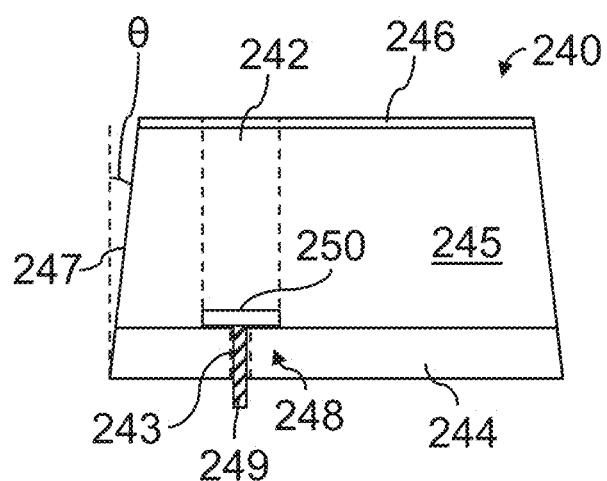
FIG. 8 is a side schematic view of the dampener of FIG. 7.

FIG. 7 is perspective view of one embodiment of a dampener 240 for use with an exit device. As noted previously, a dampener may be disposed between components of an exit device to absorb vibration and/or bias components to reduce noise and improve latch security of an exit device. According to the embodiment of FIG. 7, the dampener employs a two-layer construction having two materials in separate layers. In particular, the holder includes a base 244 and a body 245 which are composed of a first material and a second material, respectively. According to the embodiment of FIG. 7, the first material may be a cast polyurethane material which allows the base to be rigid for securing the dampener to an exit device actuator (e.g., a lever). The more rigid material of the base allows the dampener to be secured to the lever (or another actuator component) without significant deflection during normal operation which could cause a flexible, compressible material to peel off the lever over time. The dampener includes a through hole 242 which may receive a fastener (e.g., a screw) so that the base may be secured to a portion of an exit device actuator (e.g., a lever). The second material may be a viscoelastic material which compresses under force, so that vibrations from an associated actuator may be dampened. In the embodiment of FIGS. 7 and 8, the dampener also includes a low-friction or lubricating material layer 246 which assists a user in positioning the dampener inside an exit device chassis (e.g., by sliding). The low-friction material may be a solid (e.g., acetal, PTFE) or may be a liquid coating (e.g., oil) suitable to reduce a coefficient of friction between the dampener and an exit device chassis, so that the dampener may be easily slid down into a chassis of the exit device when installed.

According to some embodiments, a dampener may include a base composed of a first material and a body composed of a second material. The first material and second material may be the same material having the same or different properties, related materials, or different materials having one or more different properties or similar properties. For example, the first material may be substantially rigid, whereas the second material is compressible. The first material and second material may be integrally formed (i.e., via injection molding or overmolding) or may be joined with an adhesive or any other appropriate fastener. In some embodiments, the first material may be a thermoplastic such as polyurethane, a metal such as aluminum, a composite material, or any other suitable material providing a platform for mounting the dampener to a moving component of an exit device actuator. In some embodiments, the second material may be a polyurethane foam, amorphous polymer, semi-crystalline polymer, biopolymers, other synthetic polymer, or any other suitable compressible viscoelastic material. Of course, any suitable material may be used for the base and/or body of a dampener which absorbs and dampens vibrations in an exit device actuator, as the present disclosure is not so limited.

According to the embodiment of FIGS. 7 and 8, the dampener 240 includes a taper 247 extending away from the base 244 which allows the dampener to be molded (i.e., injection molded) and also provides the dampener with the ability to alter the force profile generated by the dampener while being compressed. As shown in FIG. 8, the taper 247 is angled at an angle θ relative to a direction which is orthogonal to the base 244. The taper 247 may function as a draft angle for release from a mold, allowing the dampener to be released from a mold without binding. Such an arrangement may improve the suitability of the dampener for mass-manufacturing, thereby reducing the cost of employing the dampener in new or existing exit devices. The taper of the body 245 of the dampener also alters the force generation curve when the dampener is compressed. According to the embodiment of FIG. 7 and as will be discussed with reference to FIG. 9, the force curve may be exponential, such that the dampener non-linearly increases the amount of force generated when compressed. That is, as the dampener is compressed from the low-friction material 246 side of the body 245, more material will resist the compression as the compression distance is increased, yielding an exponential force curve during compression. Such an arrangement may promote security of an exit device as the dampener may resist and/or absorb increased externally applied vibrations.

FIG. 8 is a side schematic view of the dampener 240 of FIG. 7, clearly showing the three-layer construction of the dampener. As shown in FIG. 8 and noted previously, the dampener includes a three-layer construction, having a base 244, body 245, and a low-friction material 246. A through hole 242 is formed through the body and is configured to receive a fastener 248 such as a screw or a bolt. A shaft hole 243 adjoins the through hole and is configured to receive a shaft 249 of a screw or bolt, while a head 250 of the screw or bolt abuts the base 244. Accordingly, when the screw of bolt is tightened to a portion of an actuator, the base will be held securely against the position of the actuator. The body in turn is held to the portion of the actuator through the integral connection of the body to the base. Of course, in other embodiments, the fastener may also hold the body securely to a portion of an actuator, as the present disclosure is not so limited.

Figure 9:
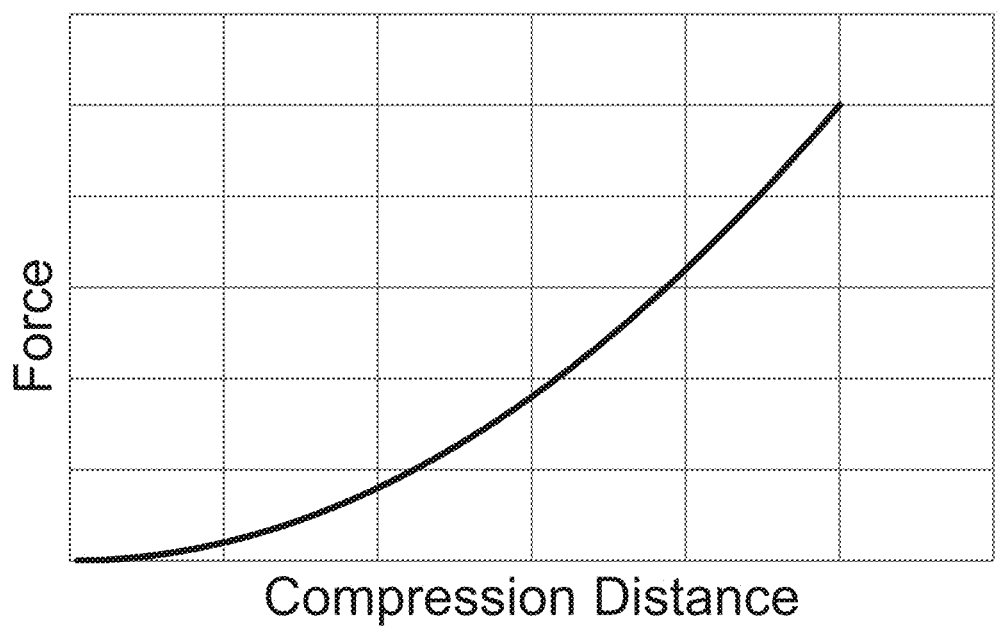
FIG. 9 is a graph showing one embodiment of a reaction force curve for a dampener.

FIG. 9 is a graph showing one embodiment of a reaction force curve for a dampener. As shown in FIG. 9, the force generated as a function of compression distance is non-linear, and is rather exponential in contrast to standard elastic springs. The dampener generating the force curve of FIG. 9 may be one similar to that the FIGS. 7-8 having a taper which results in the exponential force curve of FIG. 9. In some embodiments, materials with a non-linear reaction force profile may also be employed in the dampener alone or in combination with a taper to generate the non-linear force curve of FIG. 9. Of course, in other embodiments, a dampener may have a substantially linear force curve or any other suitable reaction force curve, as the present disclosure is not so limited.

Figures 10, 11:
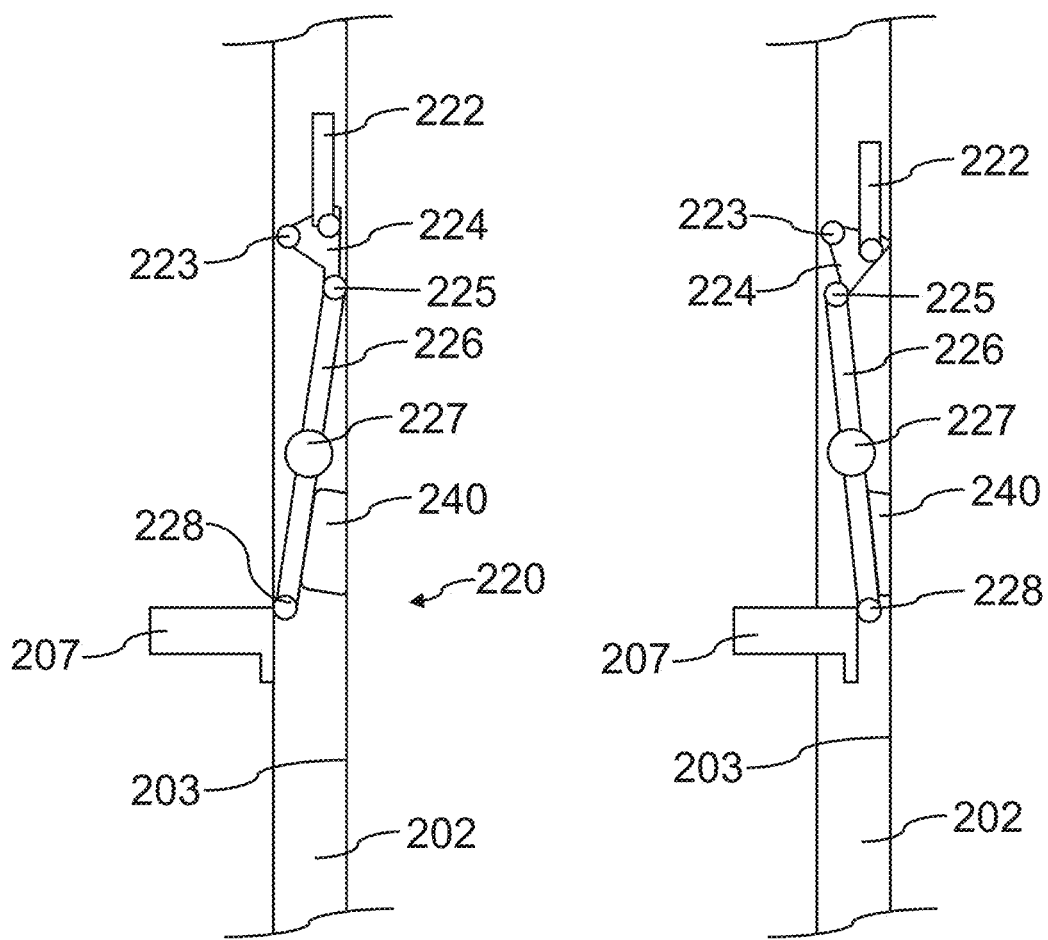
FIG. 10 is a schematic of one embodiment of a actuator and dampener in a first position.
FIG. 11 is a schematic of the actuator and dampener of FIG. 10 in a second position.

FIGS. 10-11 are schematic views of one embodiment of an actuator 220 and dampener 240 in a first position and second position, respectively, showing how the dampener interacts with the actuator to reduce audible noise, vibrations, and/or improve actuator security. As shown in FIGS. 10-11, the actuator is similar to that shown in FIGS. 5-6, having an actuator coupling 222, a rotary linkage 224 which rotates about a rotary linkage pin 223, and a lever 226 which rotates about a lever pin 227. The lever is coupled to the rotary linkage at joining pin 225 so that rotation of the lever correspondingly rotates the rotary linkage to linearly move the actuator coupling 222. The lever also includes a door actuator engagement portion 228 which is configured to contact a door actuator 207 fixed to an associated door. When a chassis 202 of the exit device is pushed toward the door from the position shown in FIG. 10, the door actuator enters the chassis and engages the lever to rotate the lever in a counterclockwise position relative to the page, as shown in FIG. 11. This rotation of the lever correspondingly rotates the rotary linkage in a clockwise direction relative to the page about rotary linkage pin 223 which in turn moves the actuator coupling towards the actuator. A vertical rod, tether, or other linkage coupled to the actuator linkage may be retracted towards the actuator to correspondingly disengage a latch so that the associated door may be opened. When the chassis is released from the position shown in FIG. 11, a spring or other biasing member may urge the lever, rotary linkage, and/or actuator linkage back to the position shown in FIG. 10, reversing the movement of each of the actuator coupling, lever, and rotary linkage.

As shown in FIGS. 10-11, the dampener 240 is disposed between the lever 226 and an inside surface 203 of the chassis 202. The dampener is attached to the lever 226 between the lever pin 227 and the door actuator engagement portion 228, so that the dampener is compressed when the lever is rotated counterclockwise relative to the page (i.e., in a direction which moves an associated latch toward a disengages position). Accordingly, the dampener resists the movement of an actuator to an actuated position (corresponding to an associated latch being disengaged). Thus, the dampener reduces the susceptibility of the actuator to inadvertently caused manual movement of the chassis 202, so that externally applied forces to a door do not allow the door to be opened. That is, a pulling or banging motion of the door on the exterior side may have otherwise caused the chassis 202 to inadvertently move toward the actuator 207, subsequently moving the lever 226 causing the latch to retract. The dampener aids in resisting such vibrations from moving the lever 226. The dampener is composed at least partially of a viscoelastic material which also absorbs vibration which may otherwise induce the actuator to move to an actuated position or generate noise. Thus, the dampener may improve security of the actuator and reduce noise by absorbing vibration and biasing the lever, and correspondingly the other components of the exit device, to an unactuated position.

Figure 12:
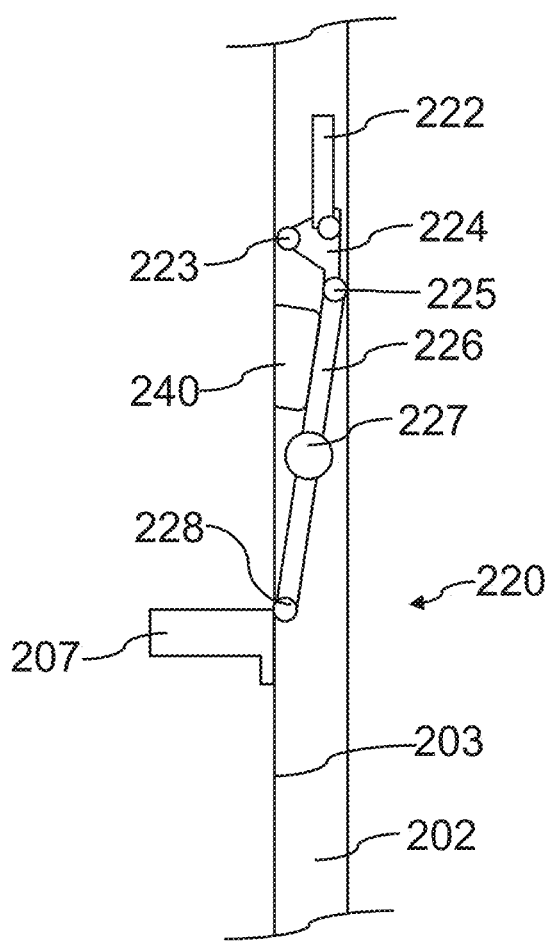
FIG. 12 is a schematic of another embodiment of a actuator and dampener in a first position.
Figure 13:
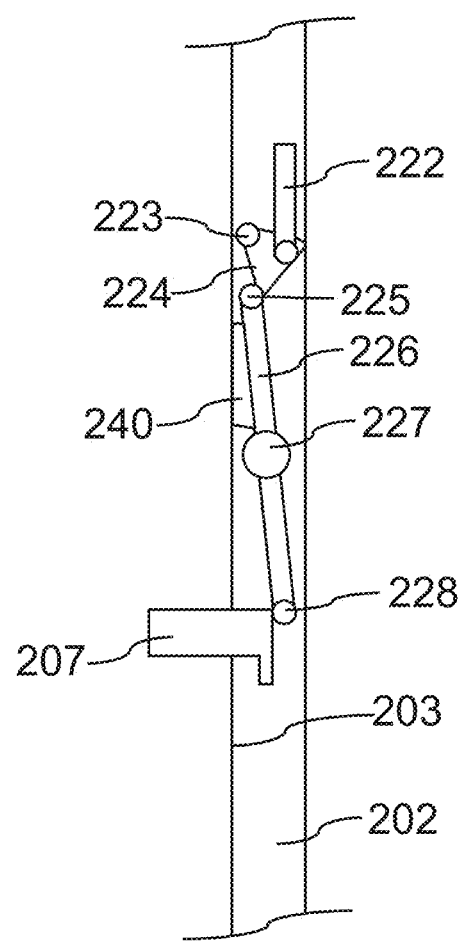
FIG. 13 is a schematic of the actuator and dampener of FIG. 12 in a second position.

FIGS. 12-13 depict schematics of another embodiment of an actuator 220 and dampener 240 in a first position and second position, respectively, showing how the dampener interacts with the actuator to reduce audible noise, vibrations, and/or improve actuator security. The actuator 220 and dampener 240 of FIGS. 12-13 are like those shown in FIGS. 10-11, but the dampener is disposed on an opposite side of the lever 226. That is, the dampener is disposed between a lever pin 227 and a joining pin 225 so that the dampener is compressed against an inside surface 203 of a chassis when the chassis is pushed toward an associated door. Like the embodiment of FIGS. 10-11, the embodiment shown in FIGS. 12-13 absorbs vibration from the lever and biases the actuator to an unactuated position to both reduce noise, reduce vibration, and increase security of the actuator. Thus, the embodiment of FIGS. 12-13 demonstrates that one or more dampeners may be disposed in different locations in the chassis and attached to different portions of the actuator. As noted previously, multiple dampeners may be employed to further damp vibrations associated with the actuator, as the present disclosure is not so limited.

In some embodiments, a method of installing a dampener into an exit device includes attaching a base of the dampener to a lever of the exit device. Attaching a base to the dampener may include inserting a screw into a through hole formed in the dampener and threading the screw into a hole formed in the lever to tighten the base to the lever. The method may also include positioning the lever and the attached dampener inside of a chassis of the exit device so that the dampener contacts the lever and an inside surface of the chassis. Positioning the lever and the dampener in the chassis may include positioning a viscoelastic portion of the dampener between the lever and the inside surface. In some embodiments, the method may include removing the lever from the chassis to simplify installation dampener. In this embodiment, when the dampener is secured to the lever, the combined lever and dampener may be replaced in the chassis.

In some embodiments, a method of operating an exit device includes pushing on a chassis of an exit device to move an actuator (e.g., a lever and associated components) from an unactuated position to an actuated position. Moving the actuator to from the unacted position to the actuated position may correspondingly move a latch from an engaged position to a disengaged position (e.g., via inducing vertical movement of a vertical rod or tether). The actuator may be moved to an actuated state by rotating a lever from a first rotational position to a second rotational position, which in turn may cooperate with a rotary linkage which converts that rotational motion to linear movement of a vertical rod or tether coupled to the latch. The method may also include compressing a dampener disposed between the actuator and an inside surface of the chassis of the exit device. Compressing the dampener may include compressing a viscoelastic material which applies a non-linear reaction force to the actuator when compressed. The method may also include receiving an external force on a door which is transmitted to the actuator through the latch, where the force is absorbed and/or damped by the dampener. The dampener may be kept in constant contact with the inside surface of the chassis and the actuator.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An exit device comprising:
a chassis;
a lever disposed fully inside the chassis configured to move between a first position and a second position;
a latch configured to move between an engaged position and a disengaged position, wherein the latch is in the engaged position when the lever is in the first position and is in the disengaged position when the lever is in the second position; and
a dampener disposed inside the chassis between the lever and an inside surface of the chassis and in contact with both the lever and the inside surface of the chassis, wherein the dampener is configured to compress when the lever is moved to the second position;
wherein the lever may be moved between the first position and the second position by applying a force to an outside surface of the chassis.

2. The exit device of claim 1, wherein the dampener is at least partially composed of a viscoelastic material.

3. The exit device of claim 2, wherein the dampener is secured to the lever.

4. The exit device of claim 1, wherein the dampener comprises:
a base formed of a first material; and
a body formed of a second material extending from the base, wherein the body is configured to abut the inside surface of the chassis.

5. The exit device of claim 4, wherein the first material is a thermoplastic and the second material is a viscoelastic material.

6. The exit device of claim 5, wherein the base and the body are integrally molded.

7. The exit device of claim 5, wherein the first material is cast polyurethane.

8. The exit device of claim 7, wherein the second material is polyurethane foam.

9. The exit device of claim 4, wherein the body is tapered in a direction away from the base.

10. The exit device of claim 4, wherein the dampener further comprises a through hole formed through the base and the body configured to receive a fastener to secure the base to the lever of the exit device.

11. The exit device of claim 4, wherein the dampener further comprises a layer of low-friction material disposed on a surface of the body opposite the base, wherein the low-friction material is different than the second material.

12. The exit device of claim 1, wherein the dampener has a non-linear force curve when compressed.

13. The exit device of claim 1, wherein the chassis, the lever, the latch, and the dampener are disposed on a single side of a door.

14. A method of installing a dampener into an exit device, comprising:
attaching a base of the dampener to a lever of the exit device, wherein the lever is configured to rotate to operate a latch of the exit device; and
positioning the lever and attached dampener fully inside a chassis of the exit device, wherein the dampener contacts an inside surface of the chassis when the lever and the attached dampener are positioned inside the chassis;

wherein the lever is configured to rotate by applying a force to an outside surface of the chassis.

15. The method of claim 14, wherein attaching the base of the dampener to the lever of the exit device comprising screwing the base to the lever.

16. The method of claim 14, wherein positioning the lever and the attached dampener in the chassis includes positioning a viscoelastic portion of the dampener between the lever and the chassis.

17. The method of claim 14, wherein the chassis, the lever, the latch, and the dampener are disposed on a single side of a door.

18. The method of claim 14, further comprising rotating the lever to operate the latch, wherein rotating the lever compresses a body of the dampener between the lever and the inside surface of the chassis.

19. The method of claim 14, wherein the dampener includes a body, wherein positioning the lever and the dampener inside of the chassis includes contacting the chassis with a layer of low-friction material disposed on a surface of the body opposite the base, wherein the body is formed of a body material, and wherein the low-friction material is different than the body material.

* * * * *